United States Patent
Allen et al.

(10) Patent No.: US 9,523,456 B1
(45) Date of Patent: Dec. 20, 2016

(54) SEGMENTED STRAKE CONCEPTS

(71) Applicant: VIV Solutions LLC, Richmond, TX (US)

(72) Inventors: Donald Wayne Allen, Richmond, TX (US); Julie Ann Dehne, Cypress, TX (US)

(73) Assignee: VIV SOLUTIONS LLC, Richmond, TX (US)

( * ) Notice: Subject to any disclaimer, the term of this patent is extended or adjusted under 35 U.S.C. 154(b) by 122 days.

(21) Appl. No.: 14/293,775

(22) Filed: Jun. 2, 2014

Related U.S. Application Data (60) Provisional application No. 61/830,149, filed on Jun. 2, 2013.

(51) Int. Cl.
*F16L 55/04* (2006.01)
*F16L 1/12* (2006.01)

(52) U.S. Cl.
CPC .............. *F16L 55/04* (2013.01); *F16L 1/123* (2013.01)

(58) Field of Classification Search
CPC ............ F16L 55/04; F16L 57/00; F16L 57/02; F16L 55/0335; F16L 55/02; F16L 55/02727; F16L 55/02772; F16L 55/035; F16L 55/041; F16L 55/043; F16L 55/045; B63B 2021/504; B63B 21/663
See application file for complete search history.

(56) References Cited

U.S. PATENT DOCUMENTS

| | | | | |
|---|---|---|---|---|
| 4,567,841 A | * | 2/1986 | Hale ..................... | B63B 21/663 114/221 R |
| 5,456,199 A | * | 10/1995 | Kernkamp ................ | B63B 1/32 114/111 |
| 2013/0014685 A1 | * | 1/2013 | Tonchia ................... | G01V 1/38 114/243 |

FOREIGN PATENT DOCUMENTS

WO    WO-2009070483    6/2009

* cited by examiner

*Primary Examiner* — Sunil Singh
*Assistant Examiner* — Carib Oquendo
(74) *Attorney, Agent, or Firm* — Blakely Sokoloff Taylor & Zafman LLP (57) ABSTRACT

Concepts for segmented helical strakes are presented herein. In one embodiment, the segmented helical strake includes a fin segment. The fin segment includes a fin body having an interior surface defining a substantially hollow interior area. The fin segment further includes a receiving member formed along the interior surface, wherein the receiving member is dimensioned to secure the fin body to a fin core positioned around a tubular. A segmented strake according to one embodiment may include a fin segment having an interior surface defining a substantially hollow interior area and a receiving member formed within the interior area. The segmented strake may further include a fin core positioned within the receiving member.

20 Claims, 12 Drawing Sheets

SEGMENTED STRAKE CONCEPTS

CROSS-REFERENCE TO RELATED APPLICATION

The application is a non-provisional application of co-pending U.S. Patent Application No. 61/830,149, filed Jun. 2, 2013 and incorporated herein by reference.

FIELD

A segmented strake, more particularly, a segmented helical strake having fin segments positioned along a fin core. Other embodiments are also described herein.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. Both helical strakes and fairings can provide sufficient VIV suppression, but can be slow and unsafe to install.

Most helical strakes consist of one or more fins that are attached to a shell, often with the fins molded into the shell. While elimination of the shell can reduce cost substantially, it is often necessary to have a shell, for example when one or more portions of the tubular need to be covered, or when marine growth protection is desired over the entire strake and tubular surface and application of marine growth protection to the tubular's outside surface is prohibited.

For many applications, the shell can be eliminated. This greatly reduces the amount of required plastic, and allows for fabrication of the strake fins at reduced cost and time.

One way to make helical strakes without a shell is to use rope or cable for the fins and wrap the rope or cable helically around the tubular. This can be fast to procure and install. However, there are obstacles associated with this method. One obstacle is that, as the tubular gets larger, the rope gets quite large and expensive. For example, the cross sectional area of a rope increases four-fold when the tubular diameter doubles. Another obstacle is that sometimes there are other adjacent tubulars around the main tubular, such as choke and kill lines for a drilling riser. If the distance between the main tubular and the closest adjacent tubular is small, it is often not possible to install the rope or cable in the space between the main tubular and the adjacent tubular.

Another way to make helical strakes without a shell is to use a segmented strake where short (relatively) rigid segments of the required fin size are strung onto a smaller diameter rope or cable which acts as the fin core. This can reduce the cost of the helical strake fins and often even decrease the fabrication time, since large diameter ropes often require custom manufacturing.

A problem associated with segmented strakes is that the individual fin segments can vibrate and rotate around the core which can potentially reduce the strake effectiveness and also reduce the fatigue life of the fin core. Another problem with simple segmented strakes is that they can still be difficult to slide in the gap between adjacent tubulars when the gap is smaller than the fin segment size. This makes it difficult, or impossible, to install the fin segments over the end of the fin core. A final problem is that, should the fin core become severed due to fatigue or any other reason, the fin segments may slide off of the fin core and into the environment (e.g. ocean).

SUMMARY

The present invention provides a segmented strake with improved characteristics and functionality. Representatively, in one embodiment, the segmented strake includes fin segments having a receiving member that restricts the fin segment from rotating relative to a fin core. In addition, the fin segments are configured such that they can be easily installed over the side of a fin core. Still further, the segmented strake disclosed herein can be easily restrained from sliding along the fin core should the fin core become severed.

Representatively, in one embodiment, the segmented strake is a helical strake including a fin segment. The fin segment includes a fin body having an interior surface defining a substantially hollow interior area. The fin segment further includes a receiving member formed along the interior surface, wherein the receiving member is dimensioned to secure the fin body to a fin core positioned around a tubular.

In another embodiment, a segmented strake is disclosed which includes a fin segment having an interior surface defining a substantially hollow interior area and a receiving member formed within the interior area. The segmented strake may further include a fin core positioned within the receiving member.

In still further embodiments, a vortex-induced vibration (VIV) suppression system is disclosed which includes a fin core operable to be helically wound around a tubular. The system further includes a plurality of fin segments positioned axially along the fin core, wherein each of the plurality of fin segments has a wall defining a substantially hollow interior area and the fin core is positioned within an opening formed along one side of the wall.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1A:
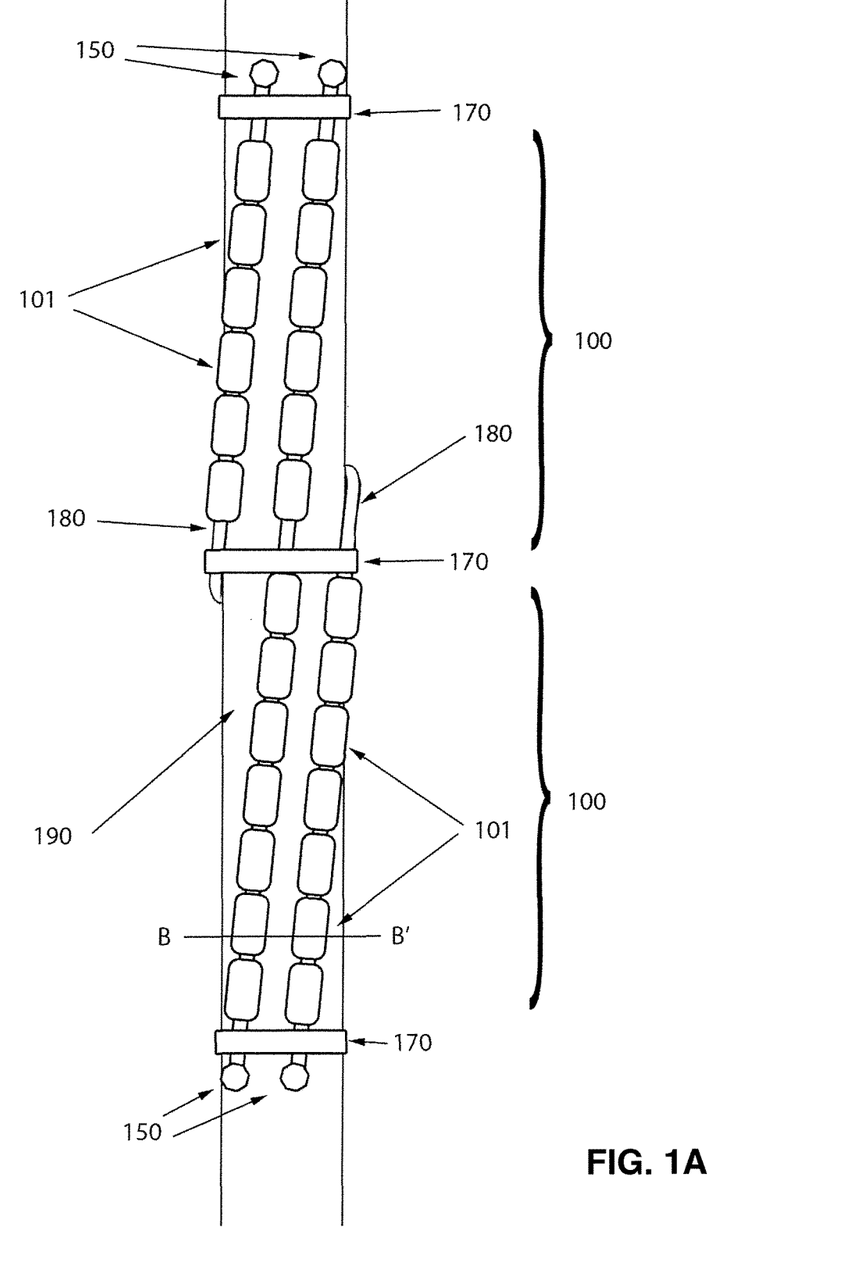
FIG. 1A is a side view of a tubular fitted with segmented strakes.

Referring now to the invention in more detail, FIG. 1A illustrates a side view of a tubular fitted with segmented strakes. Each of the segmented strakes 100 is made up of fin segments 101 positioned along fin cores 180. Fin segments 101 may be of any suitable size and shape and may be attached or inserted around fin cores 180 in any suitable manner. Fin cores 180 may be substantially of any size and shape suitable for wrapping around tubular 190. Representatively, in on embodiment, fin cores 180, and in turn fin segments 100, are helically wound around tubular 190. Optional bands 170 are used to assist with keeping fin cores 180 against, or near, tubular 190. Optional end clamps 150 assist with restricting the ends of fin cores 180 from sliding under bands 170.

Figure 1B:
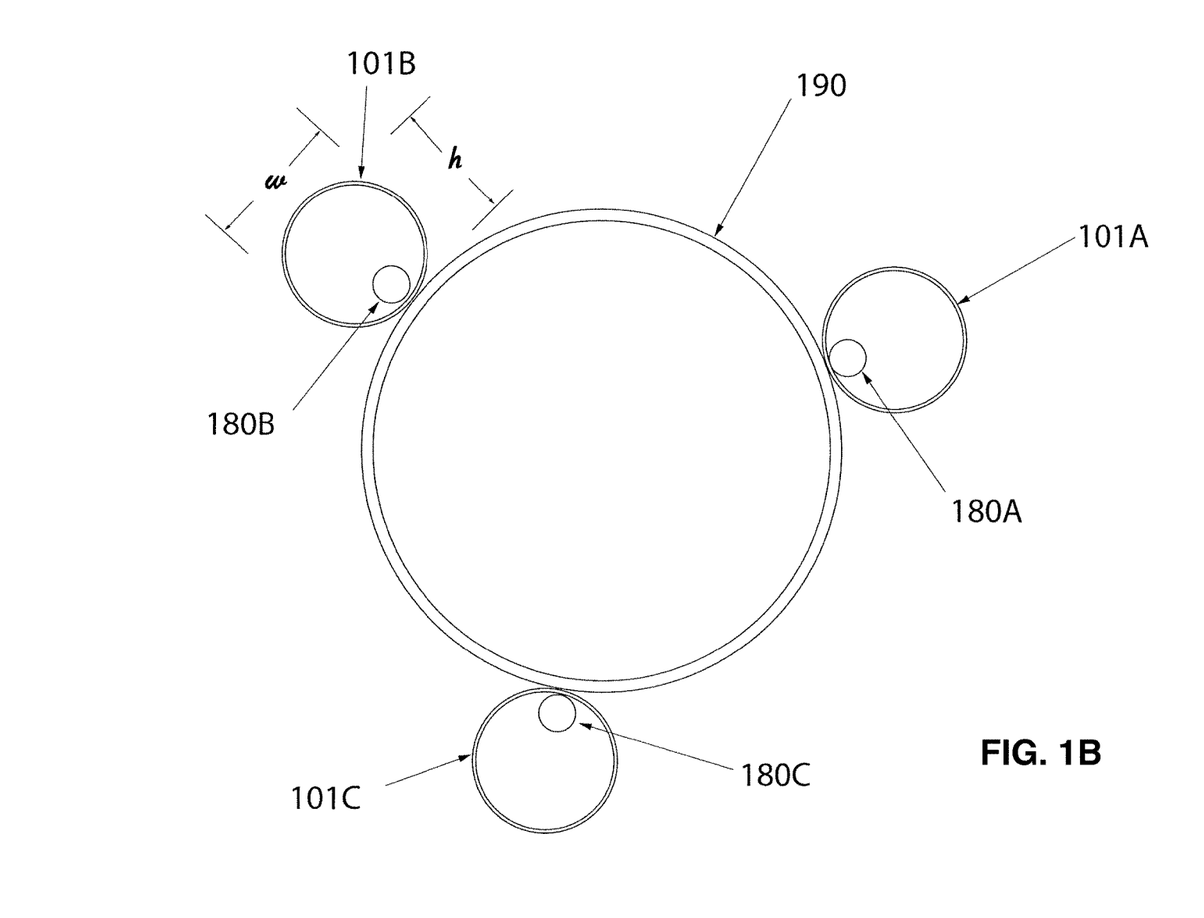
FIG. 1B is a cross sectional end view of the segmented strake of FIG. 1A along line B-B'.

FIG. 1B illustrates a cross sectional end view of the segmented strake of FIG. 1A along line B-B'. From this view, it can be seen that fin segments 101A, 101B and 101C are positioned around fin cores 180A, 180B and 180C, respectively. In one embodiment, fin segments 101A-101C may be substantially hollow structures and fin cores 180A-180C, respectively, are positioned along a side of their respective segment nearest tubular 190. In one embodiment, the width (w) of fin segments 101 (as measured along the direction of the circumference of tubular 190 at the widest point of fin segments 101) will each cover less than about 15 percent of the circumference of tubular 190. The fin segments 101 will have a height (h) (the distance normal from the tubular surface to the tip of the fin segment) of at least 40% of their width. In one embodiment, there are three "starts" which refers to the number of fin cores present at any cross section along the span of tubular 190, but there may be as few as one start and as many as 4 starts present. Fin segments 101 may each be of approximately the same length or may be made of different lengths. Sometimes different lengths are needed so that an optimal or desired number of fin segments can be used between bands 170 or between joint ends of a tubular or between any other structures.

Still referring to FIGS. 1A-1B, fin segments 101 and fin cores 180 may be made of any suitable material including, but not limited to, plastics, synthetics, metals, wood, rubbers, elastomers, and composites.

Figure 2:
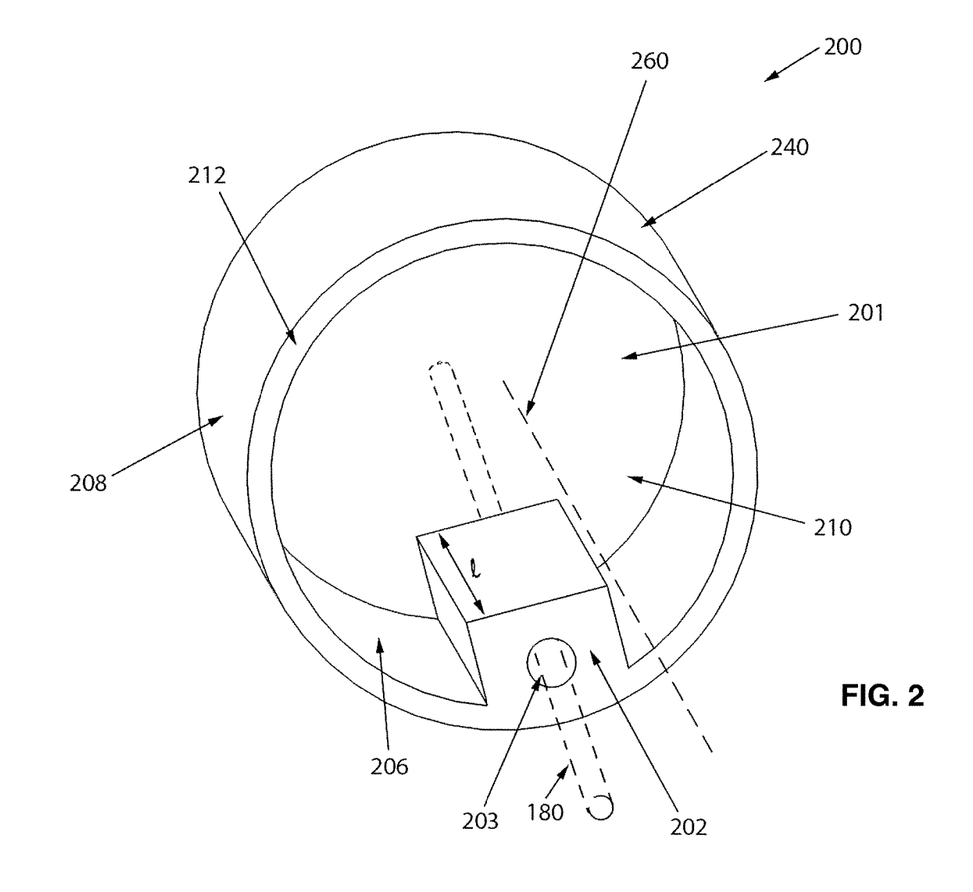
FIG. 2 is a perspective view of a fin segment.

FIG. 2 illustrates a perspective view of one embodiment of a fin segment. Fin segment 200 may include a fin body 240 which is formed by a wall 212 having an interior surface 206 and an exterior surface 208. In one embodiment, interior surface 206 defines an interior hollow area 201. In one embodiment, fin body 240 may be a substantially cylindrical or tubular shaped structure and hollow area 201 may also be a substantially cylindrical shaped area.

A receiving member 210 is formed along interior surface 206. Receiving member 210 may have any size and dimensions suitable for receiving and securing a fin core therein (e.g. fin core 180 illustrated in dashed lines). Representatively, receiving member 210 should be dimensioned to restrict fin segment 200 from rotating relative to a fin core (e.g. fin core 180). In addition, receiving member 210 should be dimensioned to restrict fin segment 200 from sliding along the fin core should the fin core become severed.

In one embodiment, receiving member 210 includes a ridge 202 which extends or protrudes from the interior surface 206 into the interior hollow area 201. Ridge 202 may be integrally formed with fin segment 200 from a single block of material, such as, for example, during an extrusion or molding process. In other embodiments, ridge 202 is a separately formed structure which is mounted to interior surface 206 after formation.

In one embodiment, ridge 202 contains opening 203, which runs the entire length (1) of ridge 202. Said another way, opening 203 may run in a direction parallel to a longitudinal axis 260 of fin body 240 such that when a fin core (e.g. fin core 180) is positioned within opening 203 it also runs parallel to longitudinal axis 260.

Again referring to FIG. 2, opening 203 is dimensioned to contain a fin core (e.g. fin core 180) so that fin segment 200 can be inserted over the fin core thru opening 203. Representatively, in one embodiment, opening 203 forms a substantially cylindrical opening or groove through which the fin core can be inserted. In one embodiment, opening 203 is substantially similar in size to the diameter of the fin core such that it clamps onto the fin core and prevents fin segment 200 from sliding around fin core or axially along the fin core. Alternatively, clamps may be used on the fin core adjacent to fin segment 200 to restrict sliding of fin segment 200 along the fin core.

Still referring to FIG. 2, fin segment 200 may be made of any suitable size and shape. In one embodiment, fin segment 200 is a tubular or cylindrical structure having a hollow interior area and open ends. In this aspect, fin segment 200 has a circular cross section. In other embodiments, fin segment 200 has other shapes and sizes, for example, a triangular, square, rectangular, elliptical or elongated shape. Similarly, hollow area 201, ridge 202 and opening 203 may be of any suitable cross sectional shape and size suitable to accommodate a fin core as described herein. For example, hollow area 201 and opening 203 may be substantially cylindrical structures. In one embodiment, ridge 202 is sized to provide additional strength so that the fin core remains in opening 203 and does not significantly displace or fracture ridge 202. For example, ridge 202 can be a substantially rectangular structure. Fin segment 200 may be of any suitable length. More than one ridge 202 and/or opening 203 may be present and thus more than one fin core may be housed in fin segment 200. Ridge 202 and opening 203 are shown on the interior of fin segment 200 but they may be located on the exterior surface instead.

Still referring to FIG. 2, fin segment 200 and ridge 202 may be made of any suitable material including, but not limited to, plastics, synthetics, metals, wood, rubbers, elastomers, and composites. Fin segment 200 and ridge 202 may be made of the same material or they may be made of different materials. Adjacent fin segments on a fin core may be identical or they may be different in size, shape, or material composition.

Figure 3A:
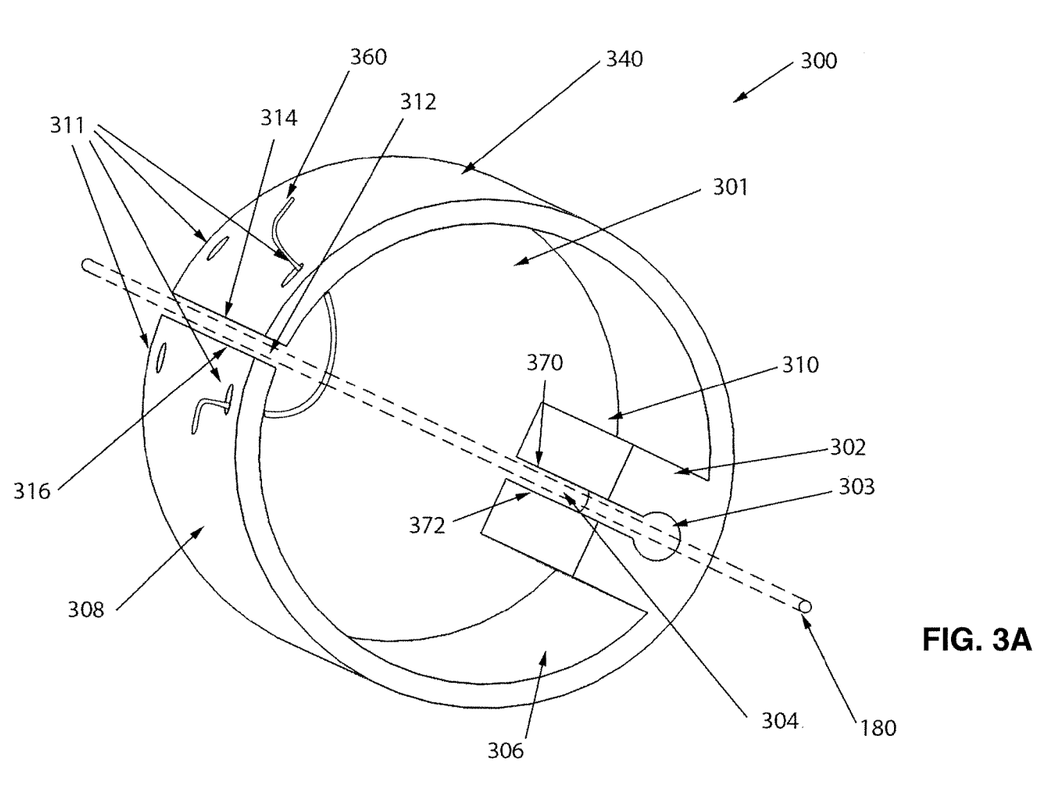
FIG. 3A is a perspective view of a fin segment with a slot for a fin core, a slot for the fin segment, and holes for fasteners.
Figure 3B:
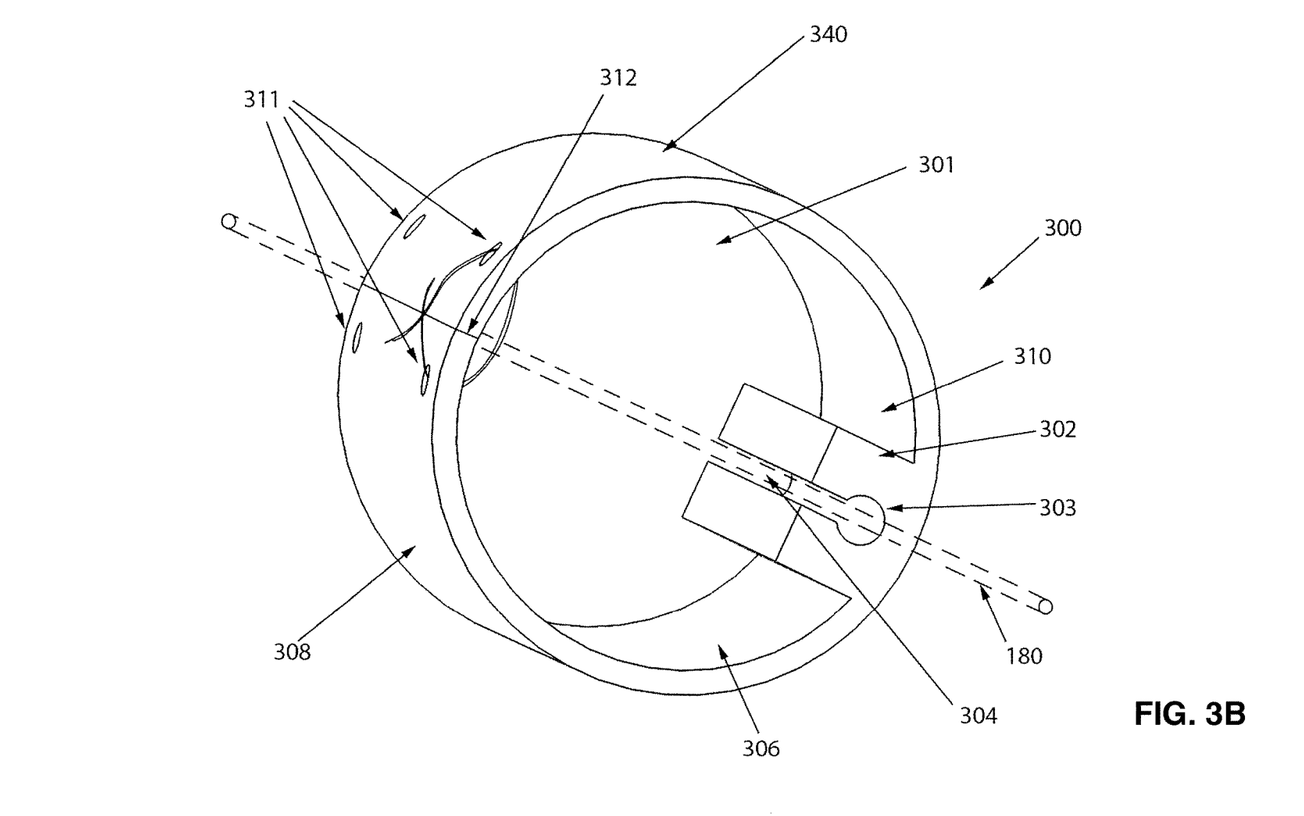
FIG. 3B is a perspective view of the fin segment of FIG. 3A with the slot closed.

FIGS. 3A-3B illustrate a perspective view of another embodiment of a fin segment. Fin segment 300 is substantially similar to fin segment 200, except in this embodiment, receiving member 310 includes a slot 304 through which a fin core can be inserted through and into an associated opening. In this aspect, fin segment 300 can be installed over a side of the fin core. Representatively, similar to fin segment 200, fin segment 300 includes a fin body 340 having an interior surface 306 and an exterior surface 308. The interior surface 306 defines an interior hollow area 301. In one embodiment, fin body 340 may be a substantially cylindrical or tubular shaped structure and hollow area 301 may also be a substantially cylindrical shaped area.

Receiving member 310 includes ridge 302. In one embodiment, ridge 302 is integral with fin segment 300. In other embodiments, ridge 302 is a separately formed structure that is mounted to interior surface 306 of fin body 340. In one embodiment, ridge 302 contains opening 303 which runs the length of ridge 302. Opening 303 may have a similar size and shape as the previously discussed openings. In one embodiment, opening 303 may form a substantially cylindrical opening or channel which runs parallel to the longitudinal axis of fin body 340. In this aspect, when fin core is positioned within opening 303, the fin core runs parallel to the longitudinal axis of fin body 340 as previously discussed in reference to FIG. 2.

Ridge 302 further includes slot 304 which opens in a direction of hollow area 301. In this aspect, slot 304 opens toward a tubular when fin body 340 is positioned around a tubular. Slot 304 may be aligned with opening 303 such that it connects opening 303 with hollow area 301. In this aspect, slot 304 may be considered closed to the exterior surface 308 and open to the interior hollow area 301. Said another way, slot 304 may be a groove or channel formed inwardly from the interior surface of ridge 302. In one embodiment, the orientation of the sidewalls 370, 372 forming slot 304 may be substantially normal to the interior surface 306 of fin body 340.

Fin segment 300 may further include slit 312 (or gap) formed between interfacing ends 314, 316 of fin body 340. Slit 312 provides an optional gap in fin segment 300 so that fin segment 300 may be placed onto a fin core thru slit 312 and slot 304. In this aspect, fin body 340 is not a continuous structure. This allows the fin core to reside in opening 303. Optional holes 311 are present around slit 312 so that a fastening or closing mechanism 360 (such as tie wraps or clamps) may be used to close slit 312 (i.e. connect interfacing ends 314, 316 together). For example, fastening mechanism 360 may be inserted through holes 311 near each of interfacing ends 314, 316 and tightened to pull ends 314, 316 together and close the gap as shown in FIG. 3B. Slit 312 can align parallel to the fin segment as shown, can be angled, or can also be cut in a non-linear pattern (i.e., saw-tooth cut that mates together when the fin segment closes).

Again referring to FIG. 3, fin segment 300 may be placed onto a fin core (e.g. fin core 180 as illustrated by dashed lines) by passing the fin core through slit 312, hollow area 301, and slot 304 and into opening 303. The fin segment 300 may be closed at slit 312 by using a fastening or closing mechanism which then provides interference at slot 304 to keep the fin core in place in opening 303. Tie wraps are an example of a closing mechanism that can be used by feeding the tie wraps through holes 311 and bringing the two sides of slit 312 together so that adequate closing pressure or force is maintained. If the fin core manages to pass out of opening 303 and into hollow area 301 through slot 304, the fin core is still constrained from passing through slit 312 by the tie wraps. This therefore provides a secondary barrier to keep fin segment 300 from coming off of a fin core. More than one slit 312 and more than one slot 304 may be present and thus more than one fin core may be housed by fin segment 300. While ridge 302 is shown integral with fin segment 300, it may be a separate structure that is attached by any suitable means including welding, clamping, chemical bonding, and fastening. It is also possible to have only fin segment 300, hollow area 301, and holes 311 and simply attach fin segment 300 directly to a fin core by, for example, running tie wraps through holes 311 and hollow area 301 and around both fin segment 300 and the fin core.

Still referring to FIG. 3, slot 304, slit 312, and holes 311 may be of any suitable size and shape. Any number of holes 311 may be used to assist with closing fin segment 300. Other closing mechanisms, such as heat sealing or welding the plastic along slit 312 may be used in place of fasteners to close fin segment 300. The fastening mechanisms can also be integral to the strake segment.

Still referring to FIG. 3, all parts shown may be made of any suitable material.

Figure 4:
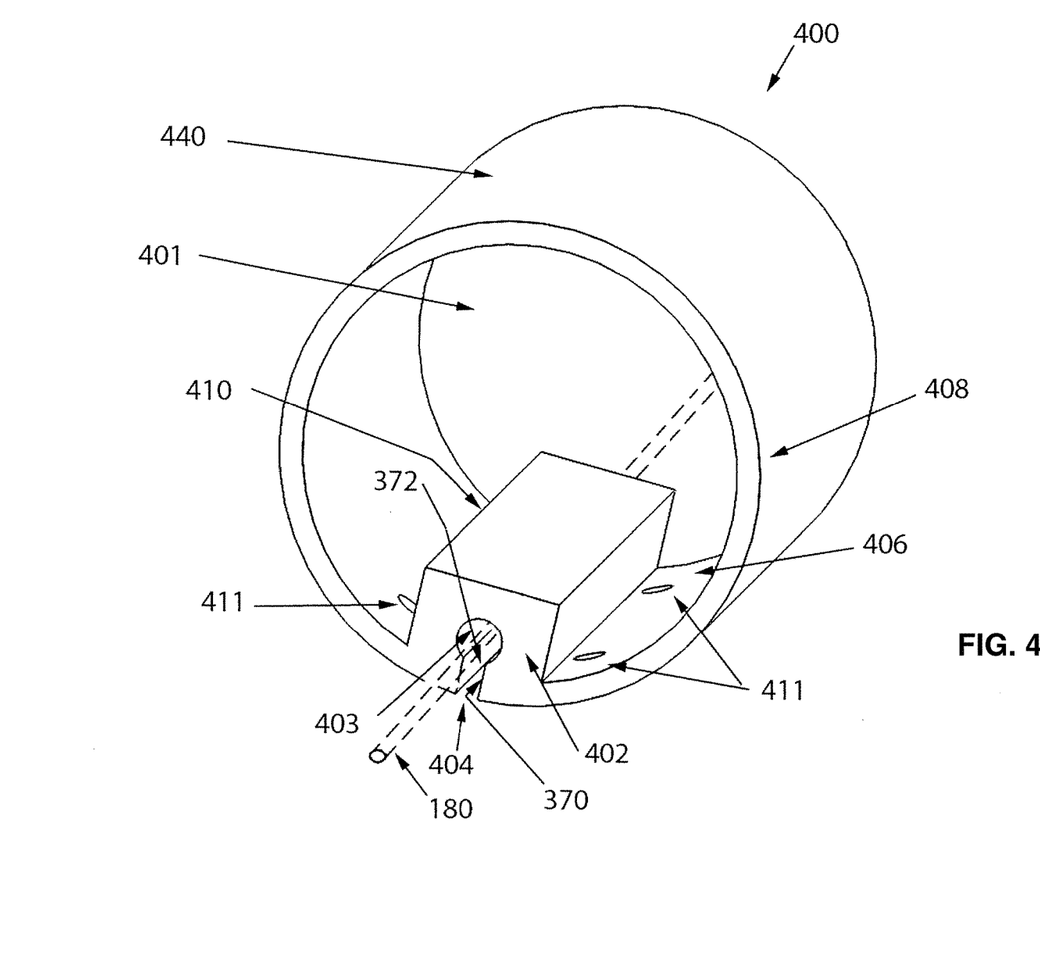
FIG. 4 is a perspective view of a fin segment with an external slot for the fin core.

FIG. 4 illustrates a perspective view of another embodiment of a fin segment. Fin segment 400 may be substantially similar to fin segment 200 except in this embodiment, receiving member 410 includes a slot 404 extending inwardly from an exterior surface 408. Representatively, fin segment 400 may include a fin body 440 having an interior surface 406 and an exterior surface 408. In one embodiment, interior surface 406 defines an interior hollow area 401. In one embodiment, fin body 440 may be a substantially cylindrical or tubular shaped structure and hollow area 401 may also be a substantially cylindrical shaped area.

A receiving member 410 is formed along interior surface 406. Receiving member 410 may have any size and dimensions suitable for receiving and securing a fin core therein (e.g. fin core 180 illustrated in dashed lines). Receiving member 410 may include a ridge 402. Ridge 402 may be integrally formed with fin segment 400 from a single material such as by an extrusion or molding process. In other embodiments, ridge 402 may be separately formed from fin segment 400 and mounted to interior surface 406.

Ridge 402 may include opening 403, which runs the length of ridge 402. Opening 403 may have a similar size and shape as the previously discussed openings. In one embodiment, opening 403 may form a substantially cylindrical opening or channel which runs parallel to the longitudinal axis of fin body 440. In this aspect, when fin core is positioned within opening 403, the fin core runs parallel to the longitudinal axis of fin body 440 as previously discussed in reference to FIG. 2.

A slot 404 may further be formed in ridge 402. Slot 404 may be formed inwardly from outer surface 408 such that it opens toward outer surface 408. In other words, slot 404 opens in a direction facing away from interior hollow area 401 and away from a tubular, around which fin segment 400 may be positioned. Slot 404 may be aligned with opening 403 such that it connects opening 403 with the exterior surface 408 of fin segment 400. In this aspect, slot 404 may be considered closed to the interior hollow area 401 and open to exterior surface 408. Said another way, slot 404 is a groove or channel formed inwardly from exterior surface 408. In one embodiment, slot 404 is oriented such that the sidewalls 370, 372 forming slot 404 are normal to the exterior surface 408.

Optional holes 411 are present around slot 404 so that a fastening or closing mechanism (such as tie wraps or clamps) may be used to (at least partially) close slot 404. In this aspect, any fin core (e.g. fin core 180) positioned within slot 404 is securely retained within receiving member 410.

Again referring to FIG. 4, fin segment 400 may be placed onto a fin core (e.g. fin core 180) by passing the fin core through slot 404 and into opening 403. A fastening or closing mechanism, such as tie wraps fed through holes 411, may be then used to at least partially close slot 404 and keep fin segment 400 from coming off of the fin core.

Still referring to FIG. 4, slot 404 may be made of any suitable size or shape. The primary function of slot 404 is to provide a path for the fin core to be inserted into opening 403 through the exterior surface 408 of fin segment 400. Slot 404 may also be sized and shaped to provide maximum resistance to movement of the fin core outside of opening 403 once fin segment 400 is installed onto the fin core. In other words, slot 404 may have substantially the same width as, or a slightly smaller width than, the fin core such that the fin core is squeezed through slot 404 and into opening 403 and prevented from falling out of opening 403 by the narrow passage way formed by slot 404.

Figure 5:
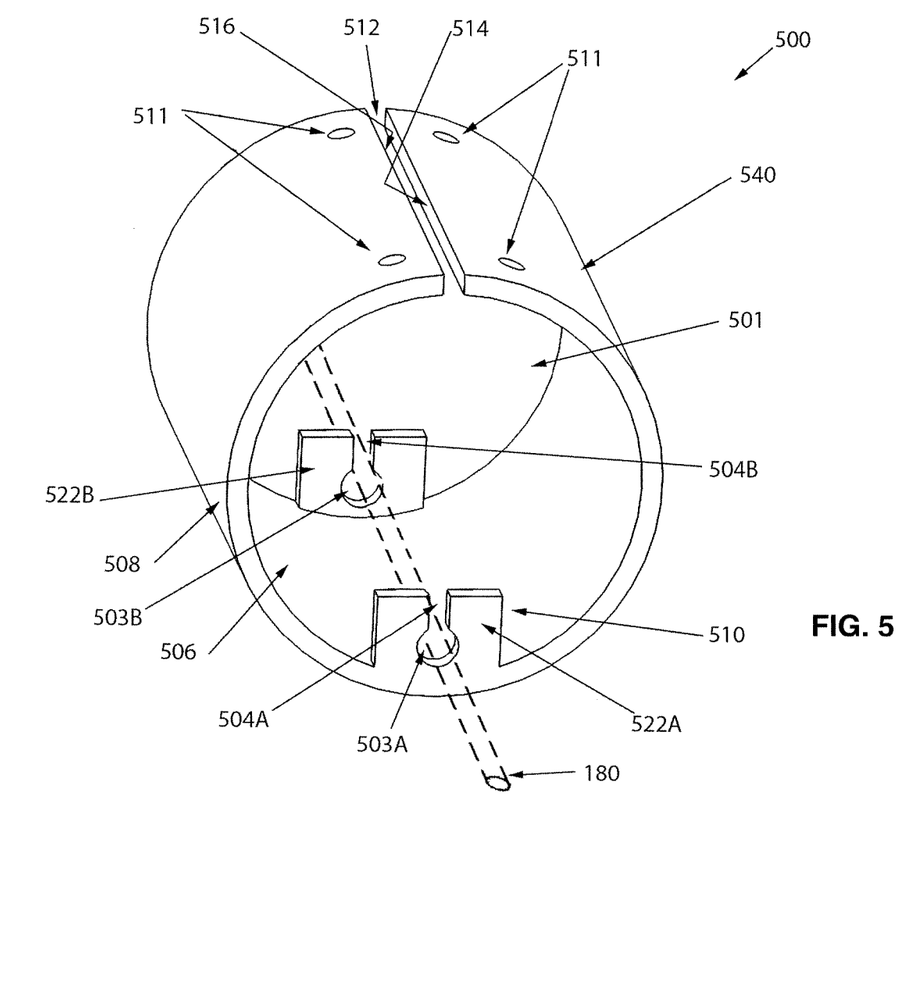
FIG. 5 is a perspective view of a fin segment with faces at the ends for maintaining position of the fin core.

FIG. 5 illustrates a perspective view of another embodiment of a fin segment. Fin segment 500 may be substantially similar to fin segment 200 except in this embodiment, receiving member 510 includes plates 522A and 522B. Representatively, fin segment 500 may include a fin body 540 having an interior surface 506 and an exterior surface 508. In one embodiment, interior surface 506 defines an interior hollow area 501. In one embodiment, fin body 540 may be a substantially cylindrical or tubular shaped structure and hollow area 501 may also be a substantially cylindrical shaped area.

A receiving member 510 is formed along interior surface 506. Receiving member 510 may have any size and dimensions suitable for receiving and securing a fin core therein (e.g. fin core 180 illustrated in dashed lines). Representatively, receiving member 510 may include plates 522A and 522B, which are aligned with one another along opposing ends of fin body 540. In other words, there is a space or gap between plates 522A and 522B that is substantially equal to a length of fin body 540. Plates 522A and 522B may be substantially planar structures that extend from interior surface 506 into the interior hollow area 501 of fin body 540.

Each of plates 522A and 522B may have openings 503A and 503B, respectively, dimensioned to receive a fin core (e.g. fin core 180). For example, openings 503A and 503B may be substantially circular openings formed within plates 522A and 522B. Openings 503A, 503B may be aligned with one another such that when a fin core is positioned within openings 503A and 503B, the fin core runs parallel to the longitudinal axis of fin body 540 as previously discussed in reference to FIG. 2.

Plates 522A and 522B may further include slots 504A and 504B, respectively. Slots 504A and 504B may be aligned with openings 503A and 503B, respectively, such that they connect openings 503A and 503B with interior hollow area 501. In one embodiment, slots 504A and 504B are narrower than openings 503A and 503B such that they help to retain the fin bore within openings 503A and 503B.

Fin segment 500 may further include slit 512. Slit 512 is formed through fin body 540 and facilitates positioning of a fin bore within fin segment 500. In this aspect, slit 512 may form a gap between interfacing ends 514, 516 of fin body 540 through which a fin bore may be inserted. Holes 511 may further be formed through fin body near interfacing ends 514, 516 to assist with closing slit 512. Representatively, as previously discussed, fin segment 500 may be closed at slit 512 by using a fastening or closing mechanism that is positioned through holes 511 and used to pull interfacing ends 514, 516 together. Tie wraps are an example of a closing mechanism that can be used by feeding the tie wraps through holes 511 and bringing the two interfacing ends 514, 516 of slit 512 together so that adequate closing pressure or force is maintained.

Again referring to FIG. 5, fin segment 500 may be placed onto a fin core by passing the fin core through slit 512, then hollow area 501, and then slots 504A, 504B so that the fin core resides in openings 503A, 503B. While two plates 522A, 522B, two openings 503A, 503B, and two slots 504A, 504B are shown, any number of plates 522A, 522B, openings 503A, 503B, and slots 504A, 504B may be present. Plates 522A, 522B, openings 503A, 503B, and slots 504A, 504B may be of any desired size and shape sufficient to provide adequate strength. Plates 522A, 522B, slots 504A, 504B and openings 503A, 503B are shown on the interior surface of fig segment 500 in FIG. 5, but may be located on the exterior surface of fin segment 500 instead.

Still referring to FIG. 5, plates 522A, 522B may be made of any suitable material. Plates 522A, 522B may be made of the same material as fin segment 500 or plates 522A, 522B may be of a different material than fin segment 500. Each of plates 522A, 522B may be made of the same material, size or shape or may be made of different materials, sizes, and/or shapes. Plates 522A, 522B may be integral to fin segment 500, or plates 522A, 522B may be separate from fin segment 500 and attached by any suitable means.

Figure 6:
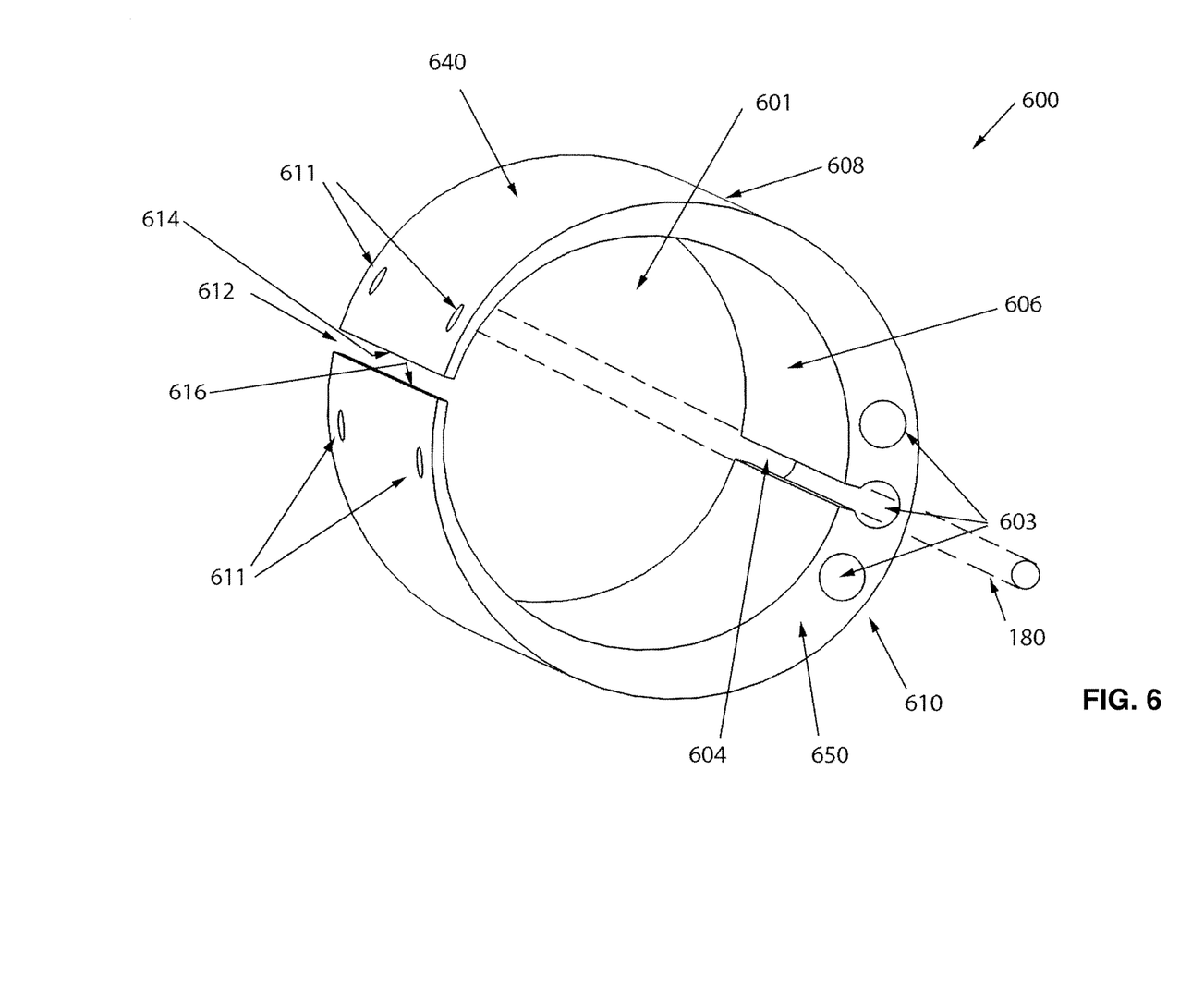
FIG. 6 is a perspective view of a fin segment with multiple openings for one or more fin cores.

FIG. 6 illustrates a perspective view of another embodiment of a fin segment. Fin segment 600 may be substantially similar to fin segment 200 except in this embodiment, receiving member 610 is formed between an interior surface 606 and exterior surface 608 of fin body 640. Representatively, fin segment 600 may include a fin body 640 having an interior surface 606 and an exterior surface 608. In one embodiment, interior surface 606 defines an interior hollow area 601. In one embodiment, fin body 640 may be a substantially cylindrical or tubular shaped structure and hollow area 601 may also be a substantially cylindrical shaped area.

Receiving member 610 may be formed within the wall 650 of fin body 640. In this aspect, receiving member 610 is between the interior surface 606 and exterior surface 608 of fin body 640. Receiving member 610 may include one or more of openings 603 formed through wall 650 of fin body 640. Openings 603 may have a similar size and shape as the previously discussed openings. In one embodiment, openings 603 may form a substantially cylindrical opening or channel which runs parallel to the longitudinal axis of fin body 640. In this aspect, when one or more fin cores are positioned within respective openings 603, they also run parallel to the longitudinal axis of fin body 640 as previously discussed in reference to FIG. 2.

Receiving member 610 may further include one or more of a slot 604. In one embodiment, receiving member 610 includes a single slot 604 that is aligned with one of openings 603. The slot 604 is formed through interior surface 606 of fin body 640 such that slot 604 opens in a direction of interior hollow area 601 and connects opening 603 to interior hollow area 601. In other words, slot 604 is open to the interior surface 606 and interior hollow area 601 and closed to the exterior surface 608. In other embodiments, slot 604 is formed through the exterior surface 608 of fin body 640 and connects opening 603 to an area outside of fin body 640.

Slit 612 may be formed through fin body 640 such that fin body 640 includes interfacing ends 614, 616 separated by a gap. Holes 611 may be formed adjacent to slit 612, near interfacing ends 614, 616. Holes 611 may be dimensioned to receive a fastening member that can be used to secure ends 614 and 616 together and close slit 612. For example, a tie or other fastening member can be inserted through holes 611 near end 614 and holes 611 near end 616 and then tightened to pull end 614 against end 616. Alternatively, slit 612 may be closed in other ways (such as clamping, chemical bonding, fastening, welding, etc.) so that the fin core is contained within fin segment 600.

Again referring to FIG. 6, fin segment 600 may be placed onto a fin core by passing the fin core through slit 612, then through hollow area 601, and then through slot 604 so that the fin core resides in one of openings 603 that is aligned with slot 604. Additional fin cores may be positioned within the remaining openings 603 not aligned with slit 604 by threading the fin cores within one end of the openings 603 and out the opposite end. In other embodiments, slots 604 may be used with multiple openings 603 to accommodate multiple fin cores. Additional slots may be placed between adjacent openings 603 in place of, or in addition to, slots between the openings 603 and hollow area 601.

Still referring to FIG. 6, any number of hollow areas 601, openings 603 and slots 604 may be part of fin segment 600. The fin segment 600, hollow area 601, openings 603 and slot 604 may be of any suitable shape or size. FIG. 6 shows a geometry that is easy to injection mold or extrude, but other geometries are also recognized as being consistent with this invention.

Still referring to FIG. 6, fin segment 600 and its parts may be made of any suitable material as discussed above for other aspects of this invention.

Figure 7:
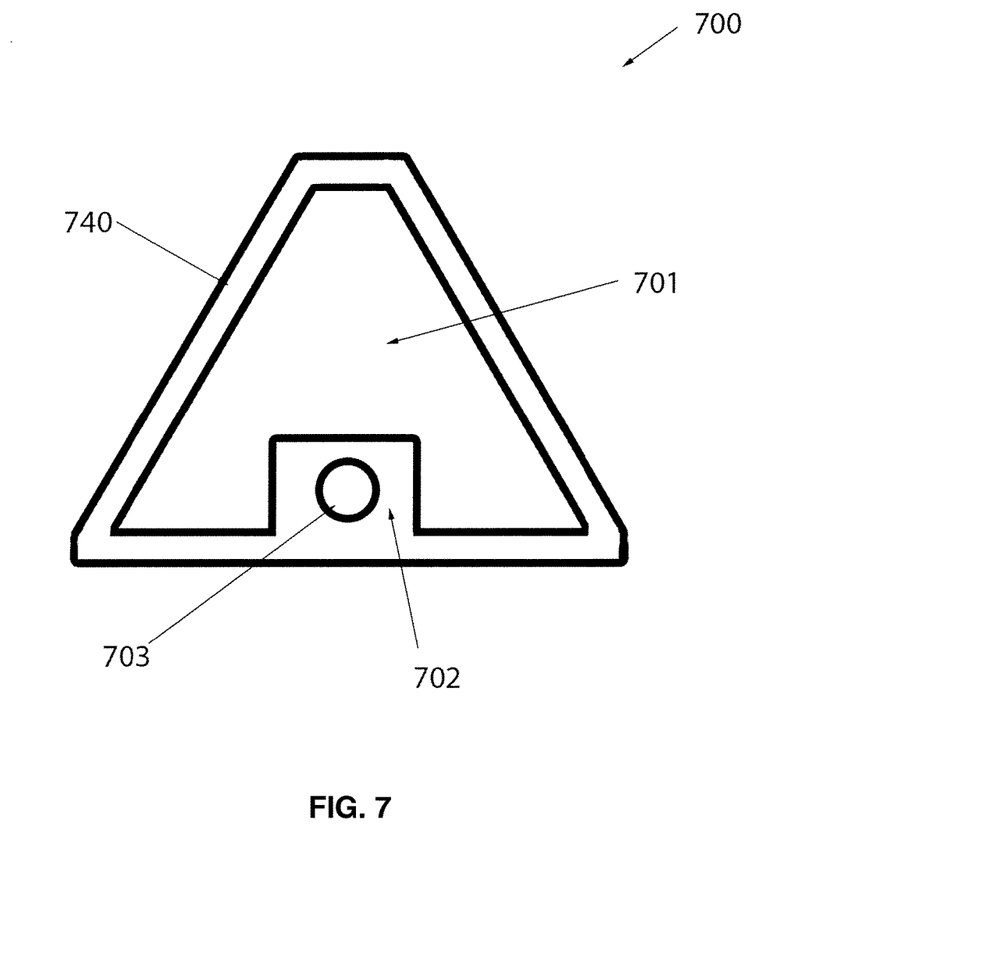
FIG. 7 is a cross sectional end view of a fin segment that is trapezoidal in shape.

Referring to FIG. 7, this figure shows trapezoidal fin segment 700 having a body 740 which defines a substantially hollow interior area 701, a receiving member 702 such as a plate (or ridge), formed in the interior area 701 and an opening 703.

Again referring to FIG. 7, fin segment 700 may be slid over a fin core by inserting one end of the fin core into opening 703 or hollow area 701. Alternatively, one or more slits or slots may be used so that fin segment 700 may be inserted over the side of a fin core without needing to slide fin segment 700 over the end of a fin core. Multiple receiving members 702 (plates or ridges), hollow areas 701, and openings 703 may be present to accommodate more than one fin core (if desired).

Still referring to FIG. 7, fin segment 700 and its components (including receiving member 702) may be made of any suitable size, shape, or material. Plate 702 may be integral with fin segment 700 or may be separate from fin segment 700 (and made of a different material if desired).

Figure 8:
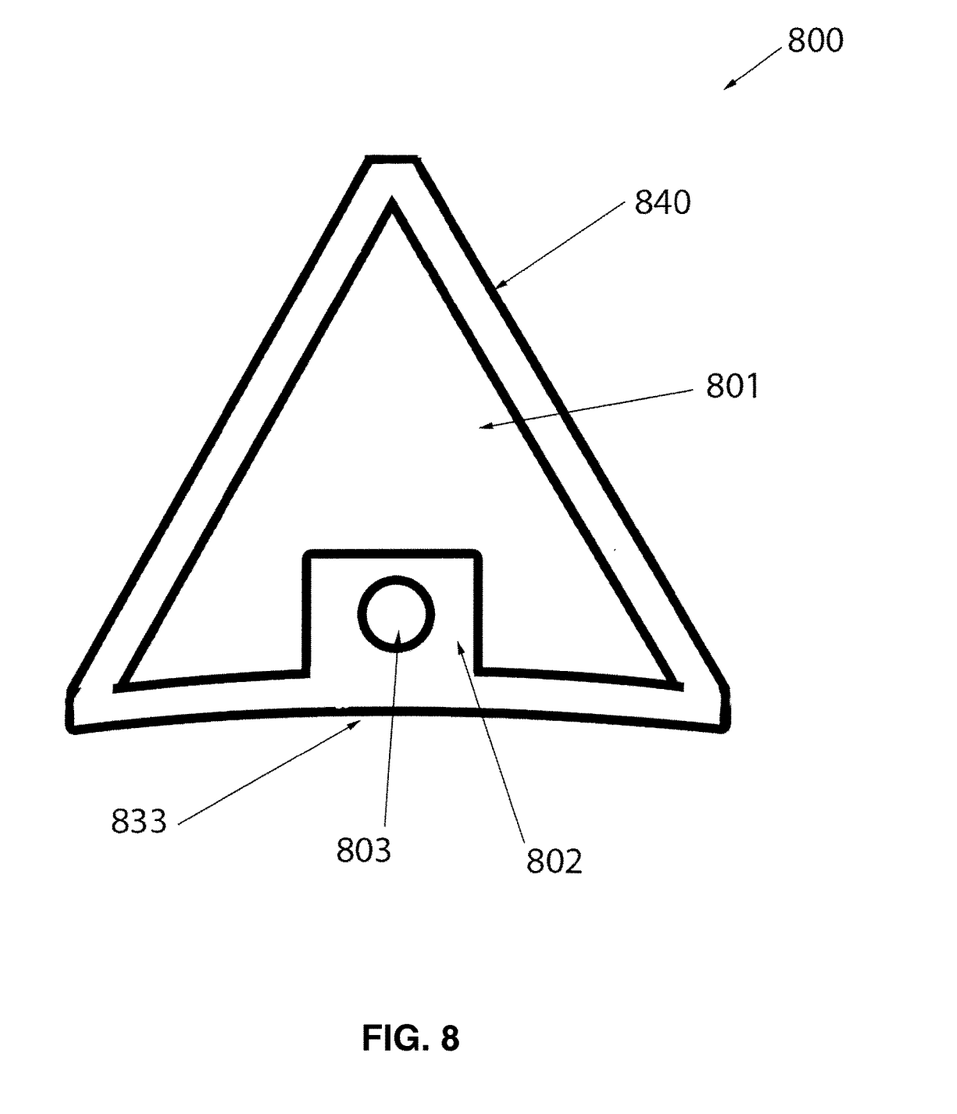
FIG. 8 is a cross sectional end view of a fin segment that is triangular in shape and having a curved side.

Referring to FIG. 8, this figure is similar to FIG. 7 except that a triangular fin segment 800 is presented. This triangular shaped segment 800 also has one curved side 833. Similar to the previously discussed fin segments, fin segment 800 includes a fin body 840 which defines a substantially hollow interior area 801 and a receiving member 802 positioned within the hollow interior area 801. Receiving member 802 may be a ridge or plate as previously discussed and include an opening 803 within which a fin core can be positioned.

Again referring to FIG. 8, it should be understood that all of the features and characteristics of the fin segment of FIG. 7, as well as the fin segments previously discussed herein, apply to fin segment 800. It is further noted that the sizes of any fin segment may be curved and, in the case of the base of the triangle of fin segment 800 in FIG. 8, this curve may be used so that the fin segment better aligns with the curvature of the underlying tubular or structural member for which it is used or applied.

Figure 9:
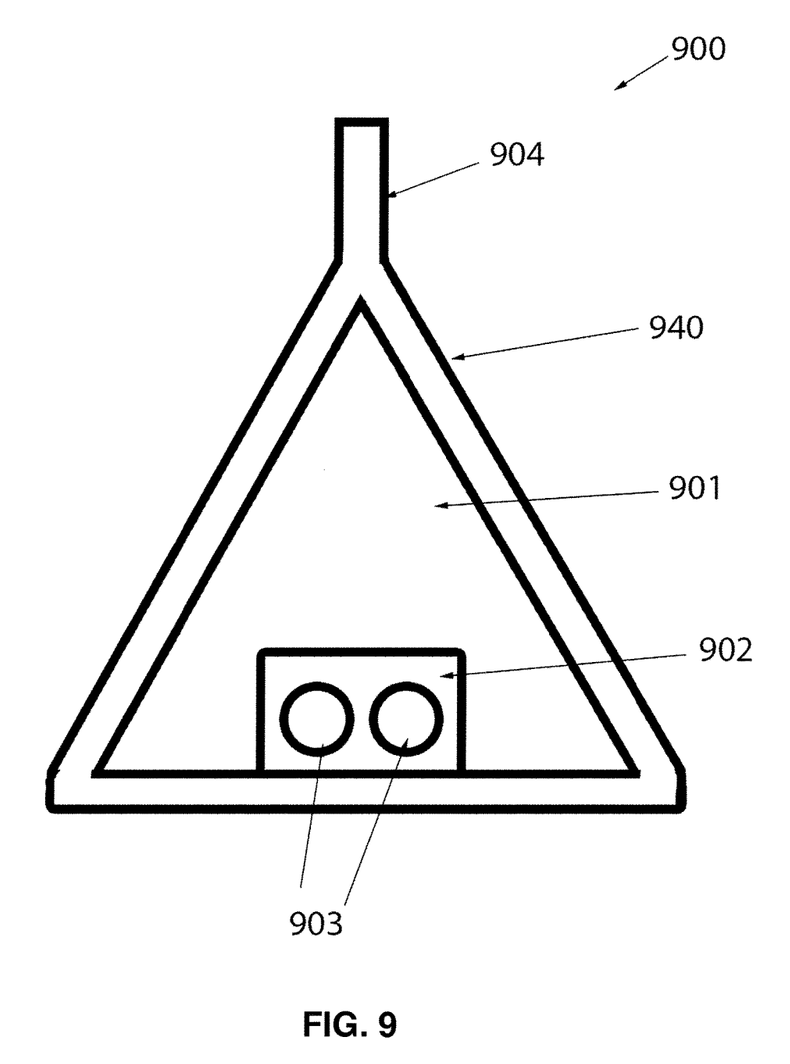
FIG. 9 is a cross sectional end view of a fin segment that is triangular in shape with a protruding member.

Referring to FIG. 9, fin segment 900 has a triangular shape and a substantially hollow interior area 901 as previously discussed, and also includes an extra extension member 904 at the top. Similar to the previously discussed fin segments, fin segment 900 may include a fin body 940 that defines a substantially hollow interior area 901. A receiving member 902, such as a plate or ridge, may be positioned within the interior area 901 as previously discussed. In this embodiment, receiving member 902 may include two openings 903.

Again referring to FIG. 9, all of the features and characteristics of the fin segments presented in this invention in other areas apply to fin segment 900. FIG. 9 illustrates that receiving member 902 may contain any number of openings 903. Alternatively, separate receiving members 902 may be used for each opening 903.

Figure 10:
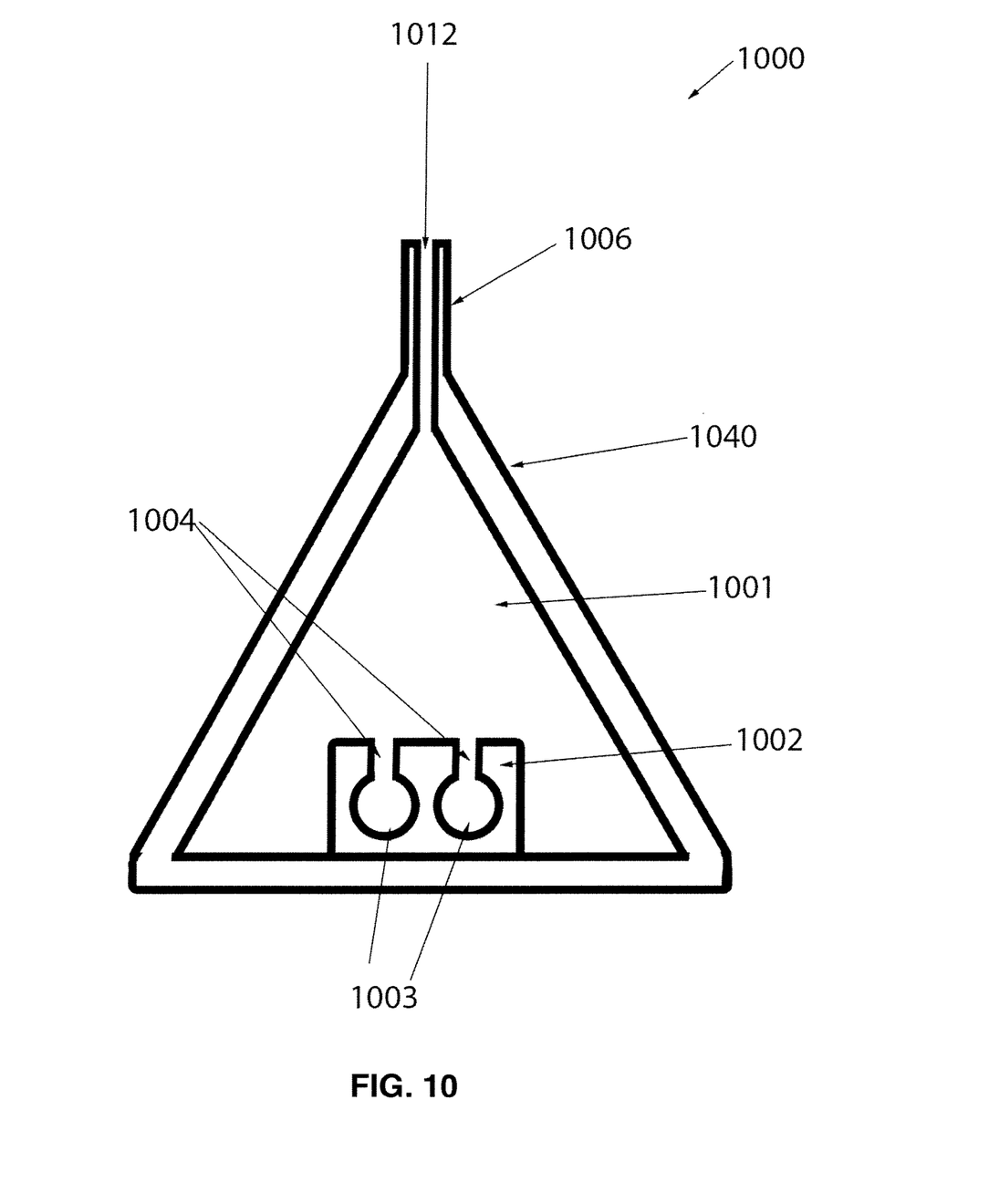
FIG. 10 is a cross sectional end view of a fin segment that is triangular in shape, with a protruding member, and with slots for the fin segment and two openings for fin cores.

Referring to FIG. 10, the fin segment 1000 of FIG. 10 is identical to FIG. 9 except that slit 1012 and slots 1004 have been added. Representatively, fin segment 1000 includes a fin body 1040 that defines a substantially hollow interior area 1001 and a receiving member 1002, such as a ridge or plate, is formed within interior area 1001. The receiving member 1002 may include one or more of openings 1003 such as those previously discussed and one or more slots 1004 connecting openings 1003 to interior area 1001 as previously discussed. A slit 1012 may further be formed through extension member 1006 at a top of fin body 1040 to facilitate insertion of a fin core within fin segment 1000 as previously discussed.

It is to be understood that any one or more of the components of the fin segments described herein may be applied to any of the fin segment embodiments disclosed herein.

In a broad embodiment, the present invention is a segmented strake with one or more individual segments that are hollow and have at least one ridge or plate for accommodating one or more fin cores.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method, and examples, but by all embodiments and methods within the scope and spirit of the invention.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A fin segment for a vortex-induced vibration (VIV) suppression apparatus comprising:
    a fin body having an interior surface defining a partially cylindrical hollow interior area; and
    a receiving member formed along the interior surface, wherein the receiving member comprises a ridge extending from the interior surface of the fin body into the interior area and having a length dimension parallel to a longitudinal axis of the fin body, and the ridge comprises a longitudinally extending opening formed therein, wherein the opening is dimensioned to receive a fin core positioned around a tubular and secure the fin body to the fin core.

2. The apparatus of claim 1 wherein the fin body has a partially circular cross-sectional shape.

3. The apparatus of claim 1 wherein the opening comprises a diameter operable to clamp the receiving member around the fin core inserted within the opening such that the fin body is fixedly attached to the fin core.

4. The apparatus of claim 1 wherein the receiving member comprises a different cross-sectional shape than the interior area of the fin body.

5. The apparatus of claim 1 wherein the opening is completely enclosed within the ridge and extends from a top end to a bottom end of the ridge.

6. The apparatus of claim 1 wherein the receiving member comprises a slot that opens toward a tubular when the fin body is positioned around a tubular.

7. The apparatus of claim 1 wherein the receiving member comprises a slot that opens away from a tubular when the fin body is positioned around a tubular.

8. The apparatus of claim 1 wherein the fin body comprises interfacing ends that are separated by a slit.

9. The apparatus claim 8 wherein the fin body comprises holes near the interfacing ends, wherein the holes are dimensioned to receive a fastener for securing the interfacing ends together.

10. A segmented strake comprising:
    a fin segment having an interior surface defining a hollow interior area and a receiving member extending from the interior surface and into the interior area and a longitudinally extending opening is formed in the receiving member;
    a fin core operable to be positioned within the longitudinally extending opening of the receiving member; and
    at least one clamping member dimensioned to clamp onto the fin core to restrict sliding of the fin segment along the fin core.

11. The segmented strake of claim 10 wherein the receiving member is dimensioned to secure the fin core against the interior surface.

12. The segmented strake of claim 10 wherein the longitudinally extending opening is a cylindrical opening that extends along an entire length of the receiving member.

13. The segmented strake of claim 10 wherein the receiving member comprises a ridge that protrudes from the interior surface of the fin segment and the longitudinally extending opening is formed through the ridge.

14. The segmented strake of claim 10 wherein the receiving member comprises a slot that is open to the interior area and closed to an exterior surface of the fin segment.

15. The segmented strake of claim 10 wherein the receiving member comprises a slot that is closed to the interior area and open to an exterior surface of the fin segment.

16. The segmented strake of claim 10 wherein the fin segment comprises a slit through which the fin core may be inserted and openings along opposing sides of the slit to facilitate closing of the slit around the fin core.

17. A vortex-induced vibration (VIV) suppression system comprising:
    a fin core operable to be helically wound around a tubular; and
    a plurality of fin segments positioned axially along the fin core, wherein each of the plurality of fin segments have a wall defining a hollow interior area and the fin core is positioned within an opening formed through a receiving member positioned within the hollow interior area, wherein the opening comprises a diameter operable to clamp the plurality of fin segments to the fin core so that the plurality of fin segments are rotatably and axially restrained along the fin core.

18. The system of claim 17 further comprising:
    a band operable to secure the fin core around the tubular.

19. The system of claim 17 wherein the opening is formed within a ridge extending from the wall and into the hollow interior area.

20. The system of claim 17 wherein a slot connects the opening to the hollow area, and wherein the slot is narrower than the opening so as to prevent the fin core from falling out of the opening.

* * * * *